(12) United States Patent
Xu et al.

(10) Patent No.: US 10,649,655 B2
(45) Date of Patent: May 12, 2020

(54) DATA STORAGE SYSTEM WITH MULTIMEDIA ASSETS

(71) Applicant: WESTERN DIGITAL TECHNOLOGIES, INC., Irvine, CA (US)

(72) Inventors: Jun Xu, Singapore (SG); Shaun Astarabadi, Laguna Niguel, CA (US); Grant C. Mackey, Irvine, CA (US); Junpeng Niu, Singapore (SG); Robin O'Neill, Trabuco Canyon, CA (US); Jie Yu, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 257 days.

(21) Appl. No.: 15/282,837

(22) Filed: Sep. 30, 2016

(65) Prior Publication Data

US 2018/0095665 A1 Apr. 5, 2018

(51) Int. Cl.
*G06F 3/06* (2006.01)
*G06F 12/02* (2006.01)
*H04L 29/06* (2006.01)

(52) U.S. Cl.
CPC ............ *G06F 3/0604* (2013.01); *G06F 3/061* (2013.01); *G06F 3/064* (2013.01); *G06F 3/067* (2013.01); *G06F 3/0614* (2013.01); *G06F 3/0644* (2013.01); *G06F 3/0685* (2013.01); *G06F 3/0688* (2013.01); *G06F 3/0689* (2013.01); *G06F 12/02* (2013.01); *H04L 67/42* (2013.01)

(58) Field of Classification Search
CPC .............................. G06F 3/0604; G06F 12/02
See application file for complete search history.

(56) References Cited

U.S. PATENT DOCUMENTS

| 5,586,264 | A | 12/1996 | Belknap et al. |
| 5,621,660 | A | 4/1997 | Chaddha et al. |
| 5,974,503 | A | 10/1999 | Venkatesh et al. |
| 6,240,243 | B1 | 5/2001 | Chen et al. |
| 7,191,198 | B2 * | 3/2007 | Asano ................. G06F 11/2007 |
| 8,321,388 | B1 * | 11/2012 | Verma ................. G06F 11/1451 707/693 |
| 8,880,801 | B1 * | 11/2014 | Robins ................ G06F 12/0246 711/114 |

(Continued)

FOREIGN PATENT DOCUMENTS

WO 2014015429 1/2014

OTHER PUBLICATIONS

Yan Liu, Chang-Sheng Xie, Huai-Yang Li, and Zhen Zhao, "Data Migration in RAID Based on Stripe Unit Heat," ICMLC 2005, LNAI 3930, pp. 614-623, 2006.

(Continued)

*Primary Examiner* — Charles Rones
*Assistant Examiner* — Tian-Pong Chang
(74) *Attorney, Agent, or Firm* — Chang & Hale LLP

(57) ABSTRACT

Systems and methods are disclosed for storing multimedia assets (or other data objects) in a storage array. Portions of the multimedia asset may be stored on different chunks of the storage drives in the storage array based on an access frequency level for a portion, an importance level for the portion, a reliability score for a chunk, and a performance score for the chunk.

19 Claims, 8 Drawing Sheets

(56) References Cited

U.S. PATENT DOCUMENTS

| | | | |
|---|---|---|---|
| 9,003,101 B1* | 4/2015 | Fallone | G06F 12/0802 |
| | | | 711/102 |
| 2006/0152636 A1* | 7/2006 | Matsukawa | G08B 13/19667 |
| | | | 348/715 |
| 2007/0185902 A1* | 8/2007 | Messinger | G06F 3/0619 |
| 2009/0083590 A1* | 3/2009 | Wylie | H03M 13/015 |
| | | | 714/703 |
| 2010/0169540 A1* | 7/2010 | Sinclair | G06F 12/0246 |
| | | | 711/103 |
| 2011/0138148 A1* | 6/2011 | Friedman | G06F 3/0613 |
| | | | 711/173 |
| 2012/0144111 A1 | 6/2012 | Weber et al. | |
| 2013/0111171 A1 | 5/2013 | Hirezaki et al. | |
| 2013/0115803 A1 | 5/2013 | Tang et al. | |
| 2013/0132800 A1 | 5/2013 | Healey et al. | |
| 2013/0290775 A1* | 10/2013 | Tucek | G06F 11/0727 |
| | | | 714/6.22 |
| 2014/0115650 A1* | 4/2014 | Zhang | H04L 65/1069 |
| | | | 725/116 |
| 2017/0352038 A1* | 12/2017 | Parekh | G06Q 30/018 |

OTHER PUBLICATIONS

U.S. Appl. No. 14/607,055, titled "Electronic System With Declustered Data Protection by Parity Based on Reliability and Method of Operation Thereof," filed Jan. 27, 2015.

International Search Report and Written Opinion for PCT/US2017/039552 dated Apr. 2, 2019.

* cited by examiner

| C1-S1 | C1-S2 | ... | C1-SL |
|---|---|---|---|
| C2-S1 | C2-S2 | ... | C2-SL |
| ... | ... | ... | ... |
| CH-S1 | CH-S2 | ... | CH-SL |

*FIG. 4A*

| C1-S1 | C2-S1 | ... | CH-S1 |
|---|---|---|---|
| C1-S2 | C2-S2 | ... | CH-S2 |
| ... | ... | ... | ... |
| C1-SL | C2-SL | ... | CH-SL |

*FIG. 4B*

| C1-S1 | ... | ... | CH-S1 |
|---|---|---|---|
| C1-S2 | ... | ... | ... |
| C2-S1 | ... | ... | ... |
| ... | ... | ... | CH-SL |

*FIG. 4C*

DATA STORAGE SYSTEM WITH MULTIMEDIA ASSETS

BACKGROUND

Field

The present disclosure relates to data storage systems. In particular, the present disclosure relates to data storage systems that may store multimedia assets.

Description of Related Art

Multimedia assets are widely available to users in various formats (e.g., streaming formats, disc formats, etc.). Examples of multimedia assets may include digital videos such as movies, sports videos, newscasts, music videos, concert videos, various types of TV programs, online videos, streaming videos, etc. Other examples of multimedia assets may include digital music such as audio clips, music albums, streaming music, podcasts, etc.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 4A is an example table illustrating an example data layout for chunks of a storage device, according to an embodiment.

FIG. 4B is an example table illustrating an example data layout for chunks of a storage device, according to an embodiment.

FIG. 4C is an example table illustrating an example data layout for chunks of a storage device, according to an embodiment.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Multimedia Assets

Multimedia assets (e.g., digital videos, digital music, etc.) are widely available to users in various formats. Multimedia assets may be stored in data storage systems to allow the multimedia assets to be accessed by multiple users. For example, a content distribution network may include a data storage system to store multiple multimedia assets and may allow users to access (e.g., consume, play, view, listen to, etc.) multimedia assets via a network.

Figure 1:
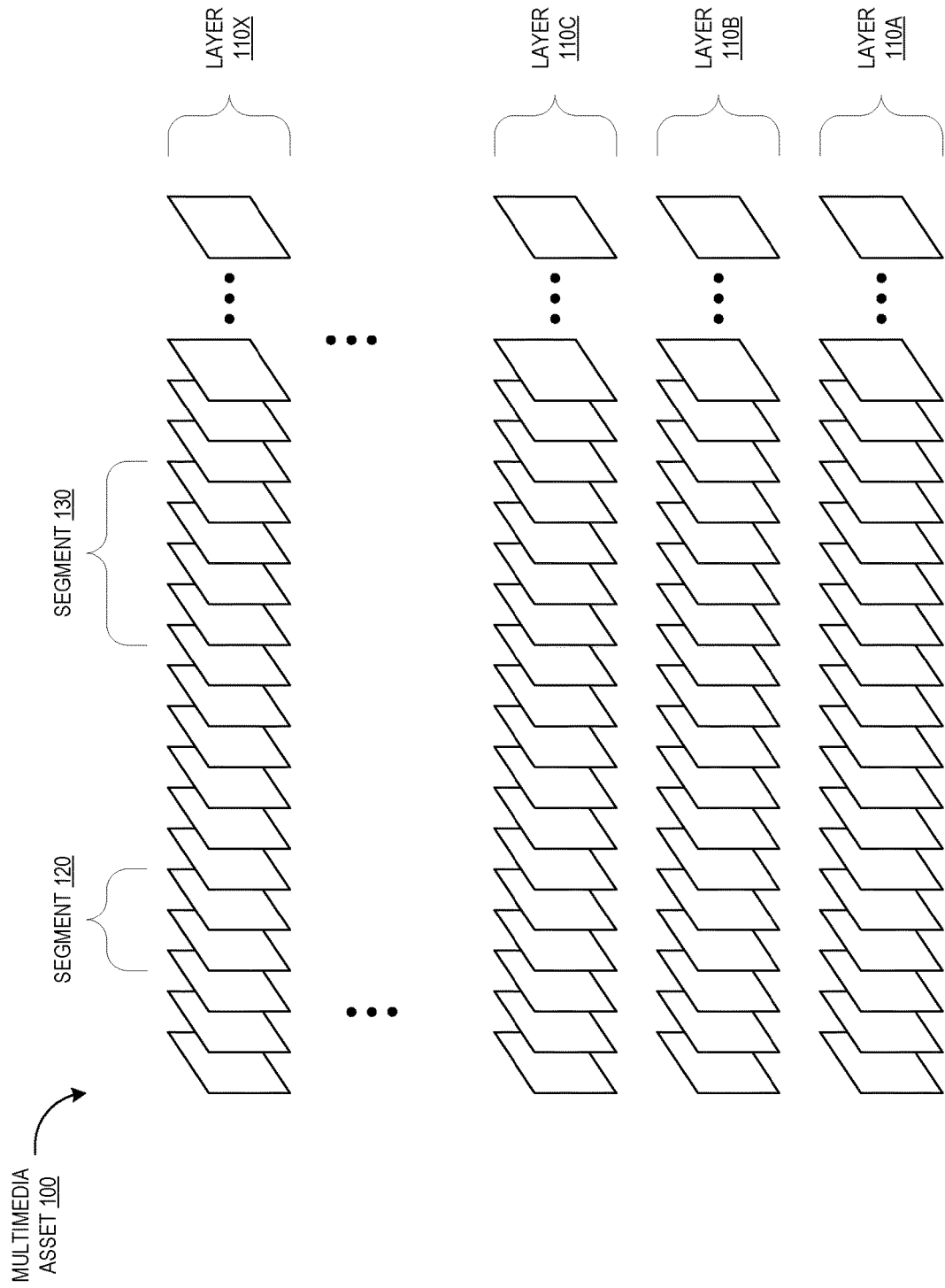
FIG. 1 is a diagram of an example multimedia asset, according to an embodiment.

FIG. 1 is a diagram of an example multimedia asset 100, according to an embodiment. The multimedia asset 100 may be divided into different portions. A portion of a multimedia asset may be a segment (e.g., a period of time in the multimedia asset) or a layer of the multimedia asset. In one embodiment, the multimedia asset 100 may be a streaming video. A streaming video may be a video that may be playable (e.g., viewable, consumable, etc.) by a computing device while the streaming video is being downloaded (e.g., downloaded from a server computing device) by the computing device. In one embodiment, the multimedia asset 100 may be an adaptive streaming video. An adaptive streaming video may be a video where the quality (e.g., bit rate, frames per second, resolution, etc.) of the video may be adjusted during playback (e.g., during viewing or during consumption) of the adaptive streaming video. For example, based on network conditions experienced by a computing device (e.g., network bandwidth, lag, loss of packets/data, etc.), the playback of the adaptive streaming video may change from a higher resolution to a lower resolution (or vice versa). One type of adaptive streaming video may a scalable video coding (SVC) video (which may be a type of H.264 video). In one embodiment, the multimedia asset 100 may be an SVC video.

As discussed above, the multimedia asset 100 may be an SVC video. The SVC video includes layers 110A through 110X. In one embodiment, layer 110A may be a base layer of the SVC video. The base layer (e.g., layer 110A) may encode the lowest temporal, spatial, and/or quality representation of the digital video. For example, the base layer may encode the digital video at a lower resolution (e.g., a resolution of 640×480 pixels, or 480P) and/or may encode the digital video at a frame rate of 20 frames per second (FPS). The layers 110B through 110X may be enhancement layers of the SVC video. An enhancement layer may encode additional information and/or data for a higher temporal, spatial, and/or quality representation of the digital video. For example, an enhancement layer may include information/data that may be used to play (e.g., decode, reconstruct, etc.) the SVC video at a higher resolution. One having ordinary skill in the art understands that a SVC video may have various numbers of enhancement layers. In one embodiment, layer 110A may be referred to as layer 1 or the first layer, layer 110B may be referred to as layer 2 or the second layer, layer 110C may be referred to as layer 3 or the third layer, etc.

In one embodiment, each of the layers 110A through 110X may include frames (e.g., video frames) and/or may include data that may be used to play (e.g., decode, reconstruct) a frame. For example, each of the squares in the layer 110A may include data for one frame of the SVC video. In another example, each of the squares in the layer 110B may include data for additional frames of the SVC video (e.g., may include additional frames for a higher FPS). In a further example, each of the squares in the layer 110C may include data for playing (e.g., decoding, reconstructing) the frames of the layer 110A at a higher resolution.

As illustrated in FIG. 1, the multimedia asset 100 may also include different segments 120 and 130. Each of the segments 120 and 130 may be associated with a period of time in the multimedia asset 100 (e.g., a period of time when the multimedia asset is played/consumed). For example, each of the segments 120 and 130 may be scenes with a digital video. A scene may refer to a set of frames combined based on one or more criteria (e.g., a common place, common actors, a consecutive occurrence over a time period, etc.). A scene may also depict events and/or actions in a location. A scene may also refer to an association of time, place (e.g., location), and/or characters (e.g., actors, people, and/or subjects) depicted in the multimedia video asset 100. Various examples of types of scenes include, but are not limited to, love scenes, dream scenes, action scenes, chase scenes, flashback scenes, fighting scenes, crash scenes, opening scenes, closing scenes, etc. In another example, each of the segments 120 and 130 may be associated with content of the digital video. For example segment 120 may be a portion of a recorded news broadcast or may be a portion of a recorded classroom lecture.

In one embodiment, a segment may include parts of data/information from multiple layers. For example, segment 120 may include a part of the data/information from layer 110A, a part of the data/information from layer 110B, a part of the data/information from 110C, etc. Although two segments 120 and 130 are indicated in FIG. 1, one having ordinary skill in the art understands that the multimedia asset 100 may include any number of different segments.

In one embodiment, the multimedia asset 100 may be associated with one of a plurality of importance levels. An importance level may be data (e.g., a number, a value, an alphanumeric string, etc.) that may indicate the importance of the multimedia asset 100 to a user. For example, the importance level may indicate how valuable the multimedia asset 100 is to a user and may be used to determine how much the multimedia asset 100 should be protected (e.g., how to store the multimedia asset 100 to prevent loss of the multimedia asset 100). In another embodiment, the different layers 110A through 110X may have different importance levels. For example, the layer 110A may be associated with the highest importance level and the layer 110X may be associated with the lowest importance level. One having ordinary skill in the art understands that various representations may be used to represent the importance levels. For example, a numerical representation may be used such that the lower the number, the higher the importance level (or vice versa). The importance level of the multimedia asset 100 and/or the layers 110A through 110X may be based on user input (e.g., may be provided by a user) and/or may be based on analysis of the multimedia asset (e.g., based on video content analysis (VCA) of the multimedia asset 100), as discussed in more detail below.

In one embodiment, the layers 110A through 110X and/or the segments of the multimedia asset 100 (e.g., segments 120 and 130) may each be associated with different access frequency levels. An access frequency level may be data (e.g., a number, a value, an alphanumeric string, etc.) that may indicate how often a segment and/or a layer may be accessed by a user or may indicate a prediction of how often a segment and/or a layer may be accessed by a user. For example, segment 120 may be associated with a higher access frequency level because segment 120 may be a segment of a digital video that is frequently viewed by different users. In another example layer 110A may be associated with a higher access frequency level because layer 110A may be a base layer of an SVC video and the base layer may accessed the most when users play the SVC video (e.g., because the enhancement layers, such as 110B through 110X, may use data from the base layer 110A). One having ordinary skill in the art understands that various representations may be used to represent the access frequency levels. For example, a numerical representation may be used such that the lower the number, the higher the access frequency level (or vice versa). The access frequency level may also be referred to as a hotness level.

Although the present disclosure may refer to digital videos (such as SVC videos), one having ordinary skill in the art understands that that the embodiments, examples, and/or implementations described herein may be applicable to other types of multimedia assets (e.g., digital music). One having ordinary skill in the art also understands that the embodiments, examples, and/or implementations described herein may be applied to data objects (e.g., files) where different portions of the data objects may be associated with different importance levels and/or access frequency levels.

Storage systems may generally store the portions of a multimedia asset in the same location. For example, the different layers of an SVC video may be stored on the same data storage device (e.g., on the same hard drive) and/or on the same location (e.g., on the same set of tracks/sectors) in the storage device. This may result in slower access to portions of the multimedia asset that are frequently accessed because all of the portions may be stored on the same storage device or on the same location in the storage device. In addition, storage systems may generally treat multimedia assets with equal importance even though some multimedia assets and/or portions of multimedia assets may be more important to users than others multimedia assets and/or other portions of multimedia assets.

Certain embodiments described herein provide the ability to store different portions of a multimedia asset across different chunks of different storage drives in a storage array, based on importance levels (e.g., how much a user may want to protect the multimedia asset) and performance levels (e.g., how frequently a portion of the multimedia asset may be accessed). The storage drives in a storage array may be divided into chunks and each chunk may be associated with a performance score (indicative of how fast data may be accessed) and a reliability score (indicative of how much protection is provided against data loss). The portions of the multimedia asset may be stored on chunks with appropriate performance levels and/or reliability levels, based on the importance levels and/or access frequency levels of the portions of the multimedia asset. This may allow for faster access to the portions of the multimedia asset that frequently accessed and may allow for more protection against loss of the portions of the multimedia asset.

Data Storage Systems

Figure 2:
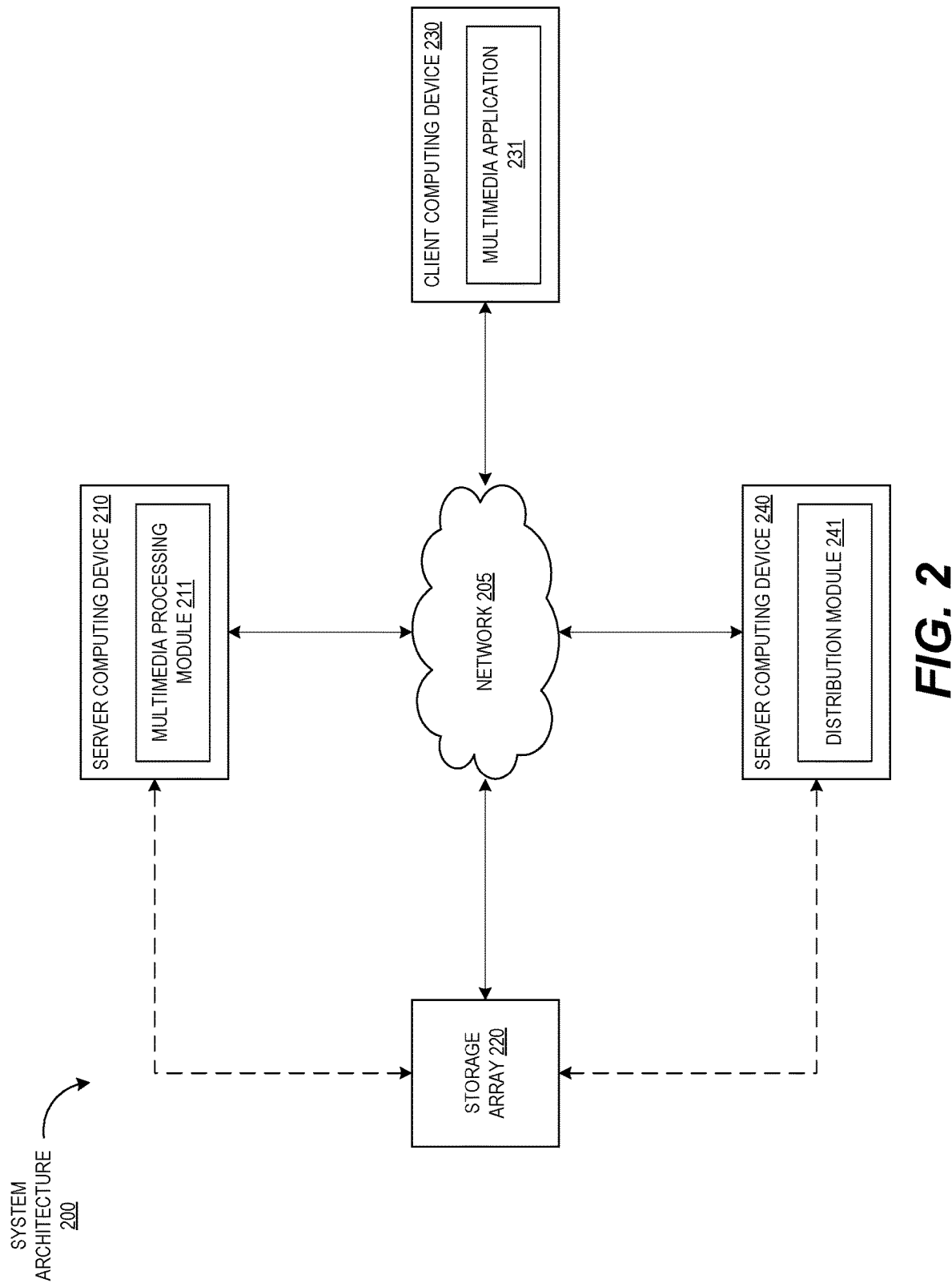
FIG. 2 is a diagram of an example system architecture, according to an embodiment.

FIG. 2 is a diagram of an example system architecture 200, according to an embodiment. The system architecture includes a network 205, a server computing device 210, a storage array 220, a client computing device 230, and a server computing device 240. In some embodiments, each of the server computing device 210, the storage array 220, the client computing device 230, and the server computing device 240 may be coupled to the network 205. In other embodiments, the storage array 220 may be coupled to the server computing device 240 and/or the server computing device 210 directly or via a separate network (not illustrated in the figures). The network 105 may include a public network (e.g., the Internet), a private network (e.g., a local area network (LAN)), or wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer network, and/or a combination thereof.

The storage array 220 may store one or more multimedia assets (e.g., multimedia asset 100 illustrated in FIG. 1) and/or other data objects (e.g., files). The storage array 220 may include multiple data storage devices (e.g., multiple storage drives such as hard drives, solid state drives (SSDs), etc.). A storage drive may comprise magnetic media, hard disk media, and/or solid-state media. While certain description herein may refer to solid state memory or flash memory generally, it is understood that solid state memory and/or flash memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Each of the data storage devices may be divided into multiple chunks (e.g., the storage space on each of the data storage devices may be divided into multiple chunks), as discussed in more detail below. A reliability score and/or a performance score may be associated with each chunk as discussed in more detail below. A reliability score may be data (e.g., a number, a value, an alphanumeric string, etc.) that may indicate how protection a chunk may provide against loss of data (e.g., how resistant a chunk is to loss of data, how recoverable is the data stored on the chunk, etc.). For example, the higher the reliability score, the more protection a chunk may provide against loss of data (and vice versa). One having ordinary skill in the art understands that various ranges of reliability scores may be used. For example, the reliability score may be a numerical value that ranges from 1 to 3, where 1 may indicate the most protection/reliability for a chunk and 3 may indicate the least protection/reliability for a chunk. A performance score may be data (e.g., a number, a value, an alphanumeric string, etc.) that may indicate how quickly the data in a chunk may be accessed (e.g., read or written). For example, the higher the performance score, the more quickly the data in the chunk may be accessed (and vice versa). One having ordinary skill in the art understands that various ranges of performance scores may be used. For example, the performance score may be a numerical value that ranges from 1 to 4, where 1 may indicate the fastest access to data for a chunk and 4 may indicate the slowest access to data for a chunks.

In one embodiment, the range (e.g., the number of) performance scores may not be equal to the number of layers in a multimedia asset. When the range of performance scores is not equal to the number of layers (e.g., when there are fewer performance scores or when the range of performance scores is smaller), the performance scores may be referred to as coarse performance scores. In another embodiment, the range (e.g., the number of) performance scores may greater than the number of layers in a multimedia asset. When the range of performance scores is greater than the number of layers (e.g., when there are more performance scores or when the range of performance scores is larger), the performance scores may be referred to as fine performance scores.

In one embodiment, the multimedia asset may be stored across the storage array 220 (e.g., different segments and/or layers of the multimedia asset may be stored on different data storage devices) based on the importance levels associated with the multimedia asset, the access frequency levels associated with the multimedia asset, the reliability score of a chunk, and/or the performance score of a chunk, as discussed in more detail below. In one embodiment, the storage array 220 may include a plurality of homogenous drives. For example, the storage array 220 may multiple storage drives that have the same capacity (e.g., storage capacity, storage space, etc.), the same model number/manufacturer, the same disk layout (e.g., the same sectors per track, the same block size, etc.), and/or the same type of storage media (e.g., magnetic discs, flash memory, etc.). In another embodiment, the storage array may include a plurality of heterogeneous drives. For example, the storage array 220 may include storage drives that have different capacity (e.g., storage capacity, storage space, etc.), the different model numbers/manufacturers, different disk layouts (e.g., different sectors per track, different block sizes, etc.), and/or the different types of storage media.

In one embodiment, the chunks and/or storage drives of the storage array may use different redundant array of independent disks (RAID) protection levels and or different coding schemes/formats (e.g., different erasure codes). For example, all of the chunks on a storage drive may use the same RAID level. In another example, some of the chunks in the storage may use one RAID level and other chunks in the storage drive may use another RAID level. In a further example, all of the chunks on the storage drive may use the same coding scheme/format. In yet another example, some of the chunks on the storage drive may use one coding scheme/format and other chunks on the storage drive may use another coding scheme/format. In one embodiment, the storage array 220 may be a declustered RAID array. A declustered RAID array may be a RAID array where RAID stripes for each RAID group are combinatorially spread across all of the storage drives in the declustered RAID array.

In one embodiment, the RAID levels and/or coding schemes/formats used by the chunks of the storage array may be determined based on user input, a configuration file, parameters, etc. For example, a user may provide input indicate which chunks should use which RAID level and/or coding scheme/format. In another example, a configuration file may indicate which chunks should use which RAID level and/or coding scheme/format. In one embodiment, a balanced incomplete block design (BIBD) may be used to determine which chunks should use which RAID level and/or coding scheme/format.

The client computing device 230 may allow users to play (e.g., consume, view, listen to, etc.) multimedia assets (or access data objects such as file) using a multimedia application 231. The multimedia application 231 may be an application (e.g., software, an app, etc.) that allows a user to play a multimedia asset (e.g., allows a user to view a digital video or listen to digital music). Examples of a multimedia application 231 include, but are not limited to, a media player application, a web browser, a music player application, a video player application, etc. The client computing device 230 may access a multimedia asset on the storage array 220 via the network 205 and/or via the server computing device 240. Examples of client computing devices may include, but are not limited to, phones (e.g., smart phones, cellular phones, etc.), cable set-top boxes, smart TV's, game consoles, laptop computers, tablet computers, desktop computers, wearable computers, and/or other network-connected computing devices.

In one embodiment, the server computing device 240 may be part of a content platform (e.g., a content distribution network/platform) that provides multimedia assets to users. For example, the server computing device 240 may allow users to stream and/or download a digital video (e.g., a multimedia asset) stored on the storage array 220. The server computing device 240 includes a distribution module 241 that may provide and/or manage access to the multimedia assets stored in the storage array 220. For example, the distribution module 241 may authenticate a user and/or client computing device 230. The distribution module 241 may obtain (e.g., read) segments and/or layers of the multimedia asset from the storage array 220 and may provide the segments and/or layers to the client computing device 230. The distribution module 241 may also allow the client computing device 230 to obtain the segments and/or layers of the multimedia asset from the storage array 220.

The server computing device 210 includes a multimedia processing module 211. In one embodiment, the multimedia processing module 211 may analyze a multimedia asset. The multimedia processing module 211 may determine an importance level for the multimedia asset and/or portions of the multimedia asset (e.g., for segments and/or layers of the multimedia asset). For example, the multimedia processing module 211 may use VCA to analyze the multimedia asset and may determine that the multimedia asset is a wedding video. The multimedia processing module 211 determine that a user may not want to lose the wedding video and may associate the multimedia asset with a high importance level (e.g., may assign the multimedia asset a high importance level).

In one embodiment, the multimedia processing module 211 may perform the VCA to analyze the multimedia asset. In another embodiment, the VCA may be performed by another module (e.g., a VCA module, an application, software, etc.) that may be located on the server computing device 210 or on another server computing device. One having ordinary skill in the art understands that various techniques, methods, functions, operations, algorithms, may be used to perform the VCA.

In one embodiment, the multimedia processing module 211 may receive the importance levels for the multimedia asset and/or portions of the multimedia asset. For example, the multimedia processing module 211 may read the importance level for a multimedia asset from a configuration file. In another example, a user may provide (user input indicating) the importance levels for the multimedia asset and/or portions of the multimedia asset.

In one embodiment, the multimedia processing module 211 may also determine access frequency levels (e.g., hotness levels) for the multimedia asset and/or portions of the multimedia asset. For example, the multimedia processing module 211 may determine the access frequency levels for layers of the multimedia asset based on the type of the layer. The base layer of a multimedia asset may be assigned the highest importance level (e.g., may be the most important) and the importance level may decrease for the enhancement layers above the base layer (e.g., layer 110C in FIG. 1 may have a lower importance level than layer 110B, layer 110D may have a lower importance level than 110C, etc.).

In another embodiment, the multimedia processing module 211 may determine the access frequency levels for the multimedia asset and/or portions of the multimedia asset based on a VCA of the multimedia asset. For example, VCA of the multimedia asset may determine that certain segments (e.g., certain scenes, certain content, certain time periods, etc.) may be accessed frequently by users viewing the multimedia asset. The multimedia processing module 211 may assign the certain segments a higher access frequency level. As discussed above, the VCA may be performed by the multimedia processing module 211 or may be performed by another module and/or computing device. Also as discussed above, one having ordinary skill in the art understands that various techniques, methods, functions, operations, algorithms, may be used to perform the VCA.

In one embodiment, the multimedia processing module 211 may receive the access frequency levels for the multimedia asset and/or portions of the multimedia asset. For example, the multimedia processing module 211 may read the access frequency levels for a multimedia asset from a configuration file. In another example, a user may provide (user input indicating) the access frequency levels for the multimedia asset and/or portions of the multimedia asset.

In one embodiment, the multimedia processing module 211 may identify a set of chunks in the storage array based on the importance level of the multimedia asset, one or more access frequency levels of the multimedia asset, performance scores associated with the set of chunks, and/or reliability scores associated with the set of chunks. For example, the multimedia processing module 211 may store the multimedia asset on chunks with a high reliability score if the importance level of the multimedia asset is high because the high importance score may indicate that the user does not want to lose the multimedia asset and the high reliability of the chunks may indicate that the chunks provide higher (or the most protection) against loss of data. In another example, the multimedia processing module 211 may also store portions (e.g., segments and/or layers) of the multimedia asset on chunks with a high performance score if the access frequency levels of the portions are high because the high performance score may indicate that the portions may be accessed faster and the high access frequency levels may indicate that the portions may be frequently accessed. In one embodiment, the multimedia processing module 211 may identify chunks that are associated with an appropriate performance score and an appropriate reliability score, based on the importance level and the access frequency level (e.g., hotness level) of the multimedia asset and/or portions of the multimedia asset. For example, the multimedia processing module 211 may identify a chunk that has a performance level indicating that the chunk may be able to provide fast enough access to data, based on the access frequency level of a portion of the multimedia asset. In another example, the multimedia processing module 211 may identify a chunk that has a reliability level indicating that the chunk may be able to provide enough protection for data, based on the importance level of a portion of the multimedia asset.

The multimedia processing module 211 may store the multimedia asset and/or portions of the multimedia asset on the chunks that are identified. For example, the multimedia processing module 211 may write a portion of the multimedia asset to the chunks (e.g., store the portion on the chunks). In another example, the multimedia processing module may cause the portion of the multimedia asset to be written to the chunks (e.g., may transmit an instruction or other data that causes the portion of the multimedia asset to be written to the chunks).

In one embodiment, the multimedia processing module 211 may determine a reliability score for each chunk in the storage array 220. As discussed above, the storage array 220 may include multiple storage drives and each storage drive may be divided into multiple chunks. The multimedia processing module 211 may determine the reliability score for a chunk based on a RAID level of the chunks. For example, different RAID levels may provide more or less protection against data loss. If a chunk uses a RAID level that provides more protection against data loss, the chunk may be assigned a higher reliability score (and vice versa). The multimedia processing module 211 may also determine the reliability score for a chunk based on a coding scheme/format used by the chunk. For example, different coding schemes/formats may provide more or less protection against data loss. If a chunk uses a coding scheme/format that provides more protection against data loss, the chunk may be assigned a higher reliability score (and vice versa). The multimedia processing module 211 may determine the reliability score for a chunk based on the type of storage drive where the chunk is located. For example, if the chunk is located on an "enterprise type" storage drive (e.g., a drive that is less prone to failure and/or is used by businesses/enterprises), the reliability score of the chunk may be higher.

In one embodiment, the multimedia processing module 211 may determine a performance score for each chunk in the storage array. The performance score for a chunk may be based on a type of storage media for a storage device where the chunk is located. For example, a chunk that is located in a flash memory of an SSD (e.g., a storage device) may be assigned a higher performance score than a chunk that is located in a magnetic disk of a hard drive (e.g., a storage device).

In embodiment, the performance score for a chunk may be based on the disk layout for a storage drive where the chunk is located. For example, the performance score for a chunk may be based on the sectors per track (SPT) in the storage drive, the rotations per minute (RPM) of the storage drive, the block size of the storage drive, etc.

In one embodiment, the range of the performance scores may be equal to the number of layers in a multimedia asset (e.g., a coarse performance score may be used). For example, if the multimedia asset is an SVC video with four layers (e.g., one base layer and three enhancement layers), the performance scores may range from 1-4. The storage array 220 may use homogenous storage drives that use magnetic/rotating media (e.g., all of the storage drives in the storage array 220 may have the same storage capacity, same model number/manufacturer, etc.). The following equation (1) may be used to determine the performance score for a current chunk of the storage array 220 when the range of performance scores is equal to the number of layers and the storage array 220 uses homogenous drives:

$$S_i = \frac{SPT_i - SPT_{min}}{SPT_{max} - SPT_{min}} L \quad (1)$$

where i is the current chunk, where $SPT_i$ is the number of sectors per track where the current chunk is located, $SPT_{min}$ is the minimum number of sectors per track in the storage drives, $SPT_{max}$ is the maximum number of sectors per track in the storage drives, and L is the number of layers in the multimedia asset. The performance score $S_i$ may be rounded up to the next whole number.

In one embodiment, the range of the performance scores may be equal to the number of layers in a multimedia asset (e.g., a coarse performance score may be used) and the storage array 220 may use heterogeneous storage drives that use magnetic/rotating media (e.g., the storage drives in the storage array 220 may have different storage capacities, different model numbers/manufacturers, etc.). The following equations (2) through (5) may be used to determine the performance score for a current chunk of the storage array 220 when the range of performance scores is equal to the number of layers and the storage array 220 uses heterogeneous drives:

$$S_i = \frac{T_i - T_{min}}{T_{max} - T_{min}} L \quad (2)$$

$$T_i = SPT_i * RPM_i \quad (3)$$

$$T_{min} = \text{min} SPT_i * RPM_i \quad (4)$$

$$T_{max} = \text{max} SPT_i * RPM_i \quad (5)$$

where i is the current chunk, $SPT_i$ is the SPT of the storage drive where the current chunk is located, $minSPT_i$ is the minimum SPT of the storage drive where the current chunk is located, $maxSPT_i$ is the maximum SPT where of the storage drive where the current chunk is located, $RPM_i$ is the RPM of the storage drive where the current chunk is located, and L is the number of layers in the multimedia asset. The performance score $S_i$ may be rounded up to the next whole number.

In one embodiment, the range of the performance scores may be equal to the number of layers in a multimedia asset (e.g., a coarse performance score may be used) and the storage array 220 may use heterogeneous storage drives that use flash memory (e.g., the storage array 220 may include SSDs that have different storage capacities, different model numbers/manufacturers, etc.). The following equations (6) through (7) may be used to determine the performance score for a current chunk of the storage array 220 when the range of performance scores is equal to the number of layers and the storage array 220 uses heterogeneous drives that use flash memory:

$$S_j = \frac{T_j - T_{min}}{T_{max} - T_{min}} L \quad (6)$$

$$T_j = (W_{rj} * T_{rj}) + (W_{wj} * T_{wj}) \quad (7)$$

where j is the current chunk, $T_{rj}$ is the read throughput of the storage device (e.g., read throughput in megabytes per second), $T_{wj}$ is the write throughput of the storage device, $W_{rj}$ is a weighting coefficient for the read throughput, $W_{wj}$ is a weighting coefficient for the write throughput, and L is the number of layers in the multimedia asset. The performance score $S_j$ may be rounded up to the next whole number.

In one embodiment, the multimedia processing module 211 may periodically re-determine the reliability scores and/or performance scores for the chunks in the storage array 220. For example, as a storage device is used more frequently, the storage device may be more prone to failure (e.g., the mean time before failure may decrease). The reliability scores of the chunks of the storage device may be changed/updated to indicate that the chunks provide less protection against data loss because the storage device is more prone to failure. In another example, as a storage device is used more frequently, the amount of time to access data may increase (e.g., the performance of components in the storage device, such as a motor, may degrade which may cause the amount of time to access data to increase). The performance scores of the chunks of the storage device may be changed/updated to indicate that it may take longer to access data. In one embodiment, when the performance scores and/or reliability scores of the chunks are changed/updated, the portions of the multimedia asset may be moved to different chunks based on the changed/updated performance scores and/or reliability scores. For example, if the reliability score of a chunk is decreased (indicating that the chunk offers less protection against data loss), then a portion of the multimedia asset with a high importance level may be moved to another chunk with an appropriate importance level.

Figure 3:
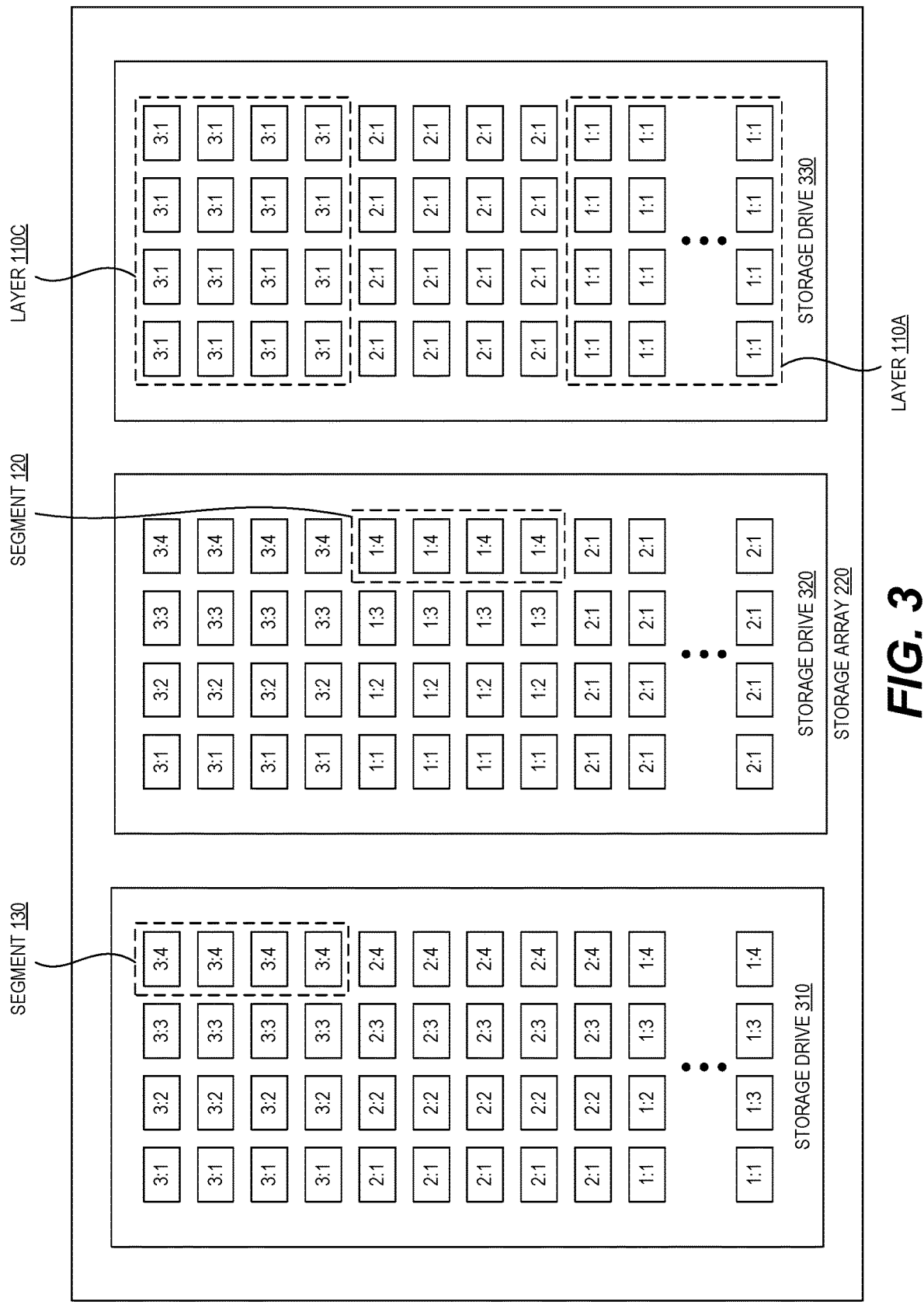
FIG. 3 is a diagram of an example storage array, according to an embodiment.

FIG. 3 is a diagram of an example storage array 220, according to an embodiment. As discussed above, the storage array 220 includes multiple storage drives 310, 320, and 330. Also as discussed above, a storage drive may be divided into chunks (e.g., the storage space of the storage drive may be divided into chunks). For example, storage drive 310 includes multiple chunks (as illustrated by the rectangular boxes in the storage drive 310), storage drive 320 includes multiple chunks (as illustrated by the rectangular boxes in the storage drive 320), and storage drive 330 includes multiple chunks (as illustrated by the rectangular boxes in the storage drive 330). In one embodiment, the storage drive 310 may include magnetic storage media (e.g., magnetic rotating disks), the storage drive 320 may include both magnetic storage media and flash memory (e.g., may be a hybrid storage drive), and the storage drive 330 may include flash memory (e.g., may be an SSD). One having ordinary skill in the art understands that in other embodiments, a different number and/or different types of storage drives may be included in the storage array 220.

Each chunk (e.g., each rectangular box in the storage drive 310, storage drive 320, and storage drive 330) may be associated with a reliability score and a performance score. The reliability score and performance score associated with a chunk is denoted as X:Y, where X is the reliability score and Y is the performance score. For example, a chunk with the notation 3:1 may have a reliability score of 3 and a performance score of 1. In the storage array 220 illustrated in FIG. 3, a lower reliability score may indicate a higher level of protection (and vice versa), and a lower performance score may indicate faster access (and vice versa). One having ordinary skill in the art understands that other embodiments may use various ranges, values, and/or representations to denote the reliability scores and/or performance scores. For example, in some embodiments, a lower number may indicate less protection against data loss or slower access to data.

As discussed above, a multimedia asset (or data object, such as a file) may be divided into different portions, such as segments or layers. For example, referring to FIG. 1, the multimedia asset 100 may be an SVC video that is divided into layers 110A through 110X and segments 120 and 130. Each portion (e.g., each segment or layer) may be associated with an importance level and an access frequency level, as discussed above. In one embodiment, a multimedia processing module (e.g., multimedia processing module 211 illustrated in FIG. 2) may identify chunks of the storage array 220 that have appropriate reliability and/or performance scores based on the importance levels and access frequency levels for the portions of the multimedia assets, as discussed above.

For example, referring to FIG. 1, the layer 110A of the multimedia asset 100 may be a base layer. The base layer may be the most important layer because the enchantment layers 110B through 110X may use the base layer. The base layer may also be the layer that is most frequently accessed when users consume (e.g., view, listen to, etc.) the multimedia asset 100. The layer 110A may be stored on chunks with the notation 1:1 (e.g., the highest level of protection and the fastest access) because layer 110A may be a base layer. The layer 110C may be an enhancement layer and that may be less important than the base layer, but is frequently accessed. The layer 110C may be stored on chunks with the notation 3:1 (e.g. the lowest level of protection and the fastest access) because the enchantment layer is less important but is frequently accessed. Segment 130 may be a portion of the multimedia asset that is not frequently accessed and is not important. For example, segment 130 may be a commercial in a digital video of a sports game (e.g., a football game). Segment 130 may be stored on chunks with the notation 3:4 (e.g., the lowest level of protection and the slowest access) because segment 130 is not as important and is not frequently accessed. Segment 120 may be a portion of the multimedia asset that is important but is not frequently accessed. For example, segment 120 may be a part of recorded classroom lecture where a professor discuss background material instead of new subject matter. Segment 120 may be stored on chunks with the notation 1:4 (e.g., the highest level of protection and the slowest access) because the segment 120 is important but is not frequently accessed.

FIG. 4A is an example table 410 illustrating an example data layout for chunks of a storage device, according to an embodiment. In one embodiment, the columns of the table 410 may represent the locations of chunks within the storage device. For example, the first column (going from the left to the right) may represent the chunks that are located on the outermost diameter (OD) or the outermost track of the storage device, the second column going from the left to the right) may represent chunks that are located on the next outermost diameter or the next outermost track of the storage device, etc. The last column may represent chunks that are located on the innermost diameter (ID) or the innermost track of the storage device. In one embodiment, accessing data (e.g., reading/writing data) on the outermost tracks/diameter may be faster than accessing data on the innermost tracks/diameter. Thus, the performance scores for chunks may decrease going from the leftmost column to the rightmost column. The performance scores may also decrease going from the top most row to the bottom most row due to different numbers of SPTs.

In one embodiment, the storage device may be a storage device that includes a rotating magnetic storage media (e.g., magnetic disks). The chunks of the storage device may store portions of a multimedia asset, as discussed above. In one embodiment, fine performance levels may be associated with (e.g., assigned to) portions of the multimedia asset. For example, the performance levels may include L levels (with one level for each layer of the multimedia asset) and each of the L levels may be divided into H sublevels. The range (or number) of performance levels may vary from 1 to L*H.

Each entry in the table 400 includes a notation in the form of CX-SY, where X ranges from 1 to H and Y ranges from 1 to L. The value CX may indicate the access frequency (or the predicted access frequency) of a portion of the multimedia asset. The value SY may indicate the layer that the portion of the multimedia asset belongs to. The notations in each column may indicate the layer of the multimedia asset that may be stored in the chunks represented by each column. For example, the first column includes notations that range from C1-S1 to CH-S1 (going from top to bottom). The value S1 in the notations may indicate that the chunks represented in the first column will store data for the first layer (e.g., layer 1 or the base layer) of the multimedia asset.

In another example, the second column includes notations that range from C1-S2 to CH-S2 (going from top to bottom). The value S2 in the notations may indicate that the chunks represented in the second column will store data for the second layer (e.g., layer 2 or an enhancement layer) of the multimedia asset. In a further example, the third column includes notations that range from C1-SL to CH-SL (going from top to bottom). The value SL in the notations may indicate that the chunks represented in the second column will store data for the Lth layer (e.g., layer L or an enhancement layer) of the multimedia asset.

FIG. 4B is an example table 420 illustrating an example data layout for chunks of a storage device, according to an embodiment. In one embodiment, the columns of the table 420 may represent the locations of chunks within the storage device. For example, the first column (going from the left to the right) may represent the chunks that are located on the outermost diameter (OD) or the outermost track of the storage device, the second column going from the left to right) may represent chunks that are located on the next outermost diameter or the next outermost track of the storage device, etc. The last column may represent chunks that are located on the innermost diameter (ID) or the innermost track of the storage device. In one embodiment, accessing data (e.g., reading/writing data) on the outermost tracks/diameter may be faster than accessing data on the innermost tracks/diameter. Thus, the performance scores for chunks may decrease going from the leftmost column to the rightmost column. The performance scores may also decrease going from the topmost row to the bottom most row due to different numbers of SPTs.

In one embodiment, the storage device may be a storage device that includes a rotating magnetic storage media (e.g., magnetic disks). The chunks of the storage device may store portions of a multimedia asset, as discussed above. In one embodiment, fine performance levels may be associated with (e.g., assigned to) portions of the multimedia asset. For example, the performance levels may include H levels and each of the H levels may be divided into L sublevels. The range (or number) of performance levels may vary from 1 to L*H.

Each entry in the table 400 includes a notation in the form of CX-SY, where X ranges from 1 to H and Y ranges from 1 to L. The value CX may indicate the access frequency (or the predicted access frequency) of a portion of the multimedia asset. The value SY may indicate the layer that the portion of the multimedia asset belongs to. The notations in each column may indicate the access frequency (or predicted access frequency) of the portion of the multimedia asset that may be stored in the chunks represented by each column. For example, the first column includes notations that range from C1-S1 to C1-SL (going from top to bottom). The value C1 in the notations may indicate most frequently accessed portions of the multimedia asset are stored in the chunks represented by the first column and that the portions may span different layers of the multimedia asset. For example, referring to FIG. 1, if segment 130 is a frequently accessed portion, then the data in each layer 110A through 110X that corresponds to segment 130 may be stored in the chunks represented by the first column.

FIG. 4C is an example table 430 illustrating an example data layout for chunks of a storage device, according to an embodiment. In one embodiment, the columns of the table 430 may represent the locations of chunks within the storage device. For example, the first column (going from the left to the right) may represent the chunks that are located on the outermost diameter (OD) or the outermost track of the storage device, the second column going from the left to the right) may represent chunks that are located on the next outermost diameter or the next outermost track of the storage device, etc. The last column may represent chunks that are located on the innermost diameter (ID) or the innermost track of the storage device. In one embodiment, accessing data (e.g., reading/writing data) on the outermost tracks/diameter may be faster than accessing data on the innermost tracks/diameter. Thus, the performance scores for chunks may decrease going from the leftmost column to the rightmost column. The performance scores may also decrease going from the topmost row to the bottom most row due to different numbers of SPTs.

In one embodiment, the storage device may be a storage device that includes a rotating magnetic storage media (e.g., magnetic disks). The chunks of the storage device may store portions of a multimedia asset, as discussed above. In one embodiment, fine performance levels may be associated with (e.g., assigned to) portions of the multimedia asset. For example, the performance levels may include H levels and each of the H levels may be divided into L sublevels. The range (or number) of performance levels may vary from 1 to L*H.

Each entry in the table 400 includes a notation in the form of CX-SY, where X ranges from 1 to H and Y ranges from 1 to L. The value CX may indicate the access frequency (or the predicted access frequency) of a portion of the multimedia asset. The value SY may indicate the layer that the portion of the multimedia asset belongs to. The notations in each column may indicate that the portions of the multimedia asset are stored in the chunks represented by the columns based on the product of the value CX and SY. For example, the products (of CX and SY) with the lowest values may be stored in the first column, and the products (of CX and SY) with the next lowest values may be stored in the second column, etc. The products (of CX and SY) with the highest values may be stored in the last column. In one embodiment, when the two entries in a column have the same product of their respective CX and SY, the entry with the lower CX value may be located at a higher entry/position in the column. This may indicate that within a column, entries with a lower CX value may be preferred (e.g., may indicate that portions of a multimedia asset that are more frequently accessed are located in chunks that provide faster access). In one embodiment, when the two entries in a column have the same product of their respective CX and SY, the entry with the lower SY value may be located at a higher entry/position in the column. This may indicate that within a column, entries with a lower SY value may be preferred (e.g., may indicate that lower layers of a multimedia asset are located in chunks that provide faster access).

Figure 5:
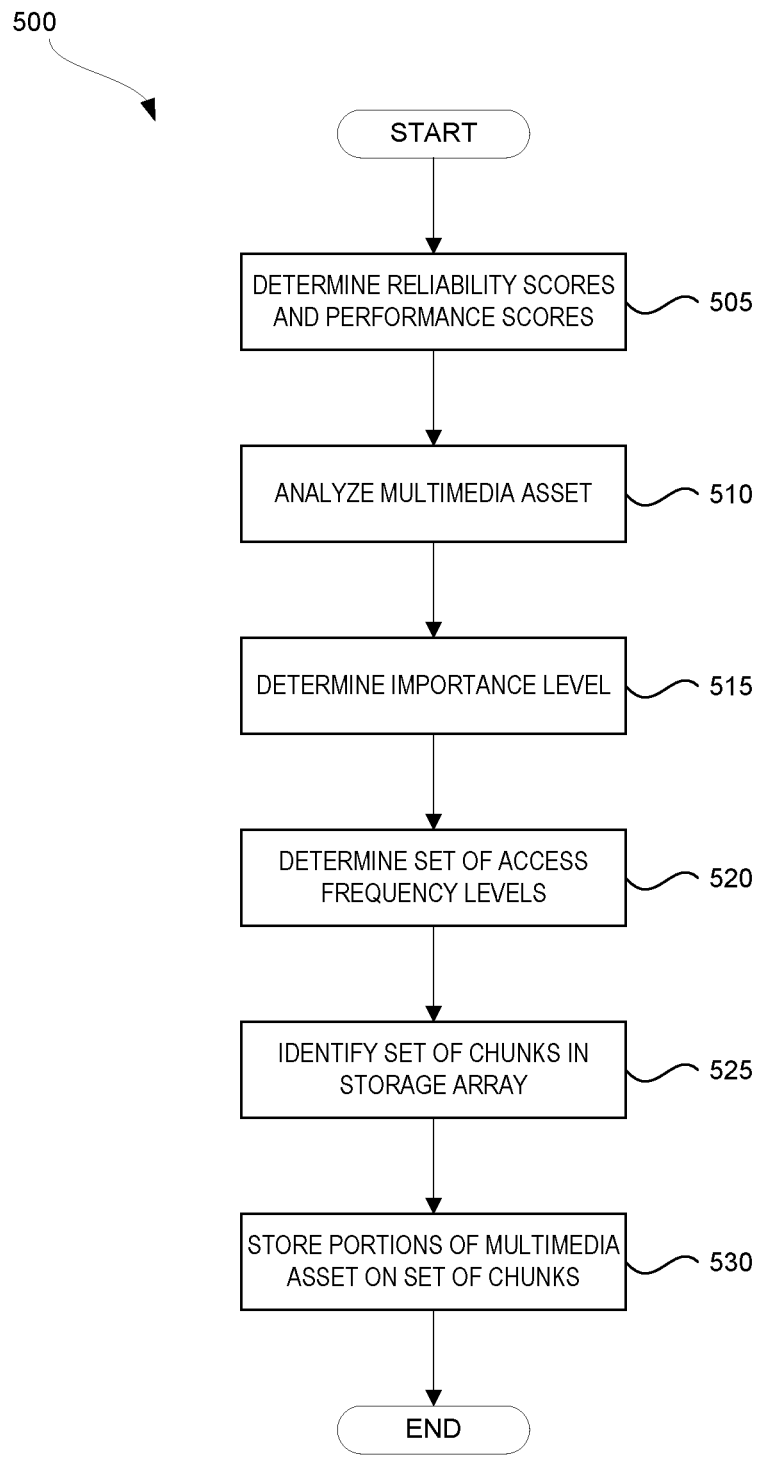
FIG. 5 is a flow diagram illustrating an example process for storing a multimedia asset in a storage array, according to an embodiment.

FIG. 5 is a flow diagram illustrating an example process 500 for storing a multimedia asset in a storage array, according to an embodiment. The process 500 may be performed by a multimedia processing module, a processing device (e.g., a processor, a central processing unit (CPU)), and/or a computing device (e.g., a server computing device). The multimedia processing module, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 may optionally determine reliability scores and/or performance scores for chunks in a storage array, as discussed above. For example, the process 500 may use one or more of the equations (1) through (7) to determine, calculate, etc., performance scores for chunks in the storage array (as discussed above). In another example, the process 500 may determine reliability scores based on RAID levels and/or coding schemes/formats schemes used by the chunks (as discussed above). The process 500 may optionally analyze a multimedia asset at block 510. For example, the process 500 may perform a VCA on the multimedia asset, as discussed above.

At block 515, the process 500 may determine an importance level for the multimedia asset. For example, the process 500 may determine how important a multimedia asset is to a user (e.g., how much a user wants to protect the multimedia asset against loss) based on the VCA, as discussed above. In some embodiment, the process 500 may determine importance levels for different portions of the multimedia asset as well. For example, the process 500 may determine importance levels for segments and/or layers of the multimedia asset. The process 500 may determine a set of access frequency levels (e.g., hotness levels) for the multimedia asset and/or portions of the multimedia asset (e.g., segments, layers, etc.) based on the VCA at block 520, as discussed above. The access frequency levels may be data that may indicate how often/frequently a portion of the multimedia asset may be accessed. For example, the access frequency level may be a number indicating a prediction of how often a portion of the multimedia asset may be accessed. In another example, the access frequency level may be a number indicate how often a portion of the multimedia asset was previously accessed. As discussed above, the multimedia asset may include multiple portions.

At block 525, the process 500 may identify a set of chunks in the storage array, as discussed above. For example, the process 500 analyze the importance level and access frequency level for a portion of the multimedia asset. The process 500 may analyze the chunks of the storage array to identify chunks that have a reliability score and a performance score appropriate for the importance level and the access frequency level for the portion of the multimedia asset. The process 500 may store the portions of the multimedia asset in the (identified) set of chunks at block 530. As discussed above, different portions of the multimedia asset may be stored on different storage drives of the storage array based on the reliability scores and performance scores of the chunks, as discussed above. For example, a first portion (e.g., a first layer) of the multimedia asset may be stored on chunks (that are associated with a first performance score) from a first storage drive and a second portion (e.g., a second layer) of the multimedia asset may be stored on chunks (that are associated with a second performance score) from a second storage drive.

Figure 6:
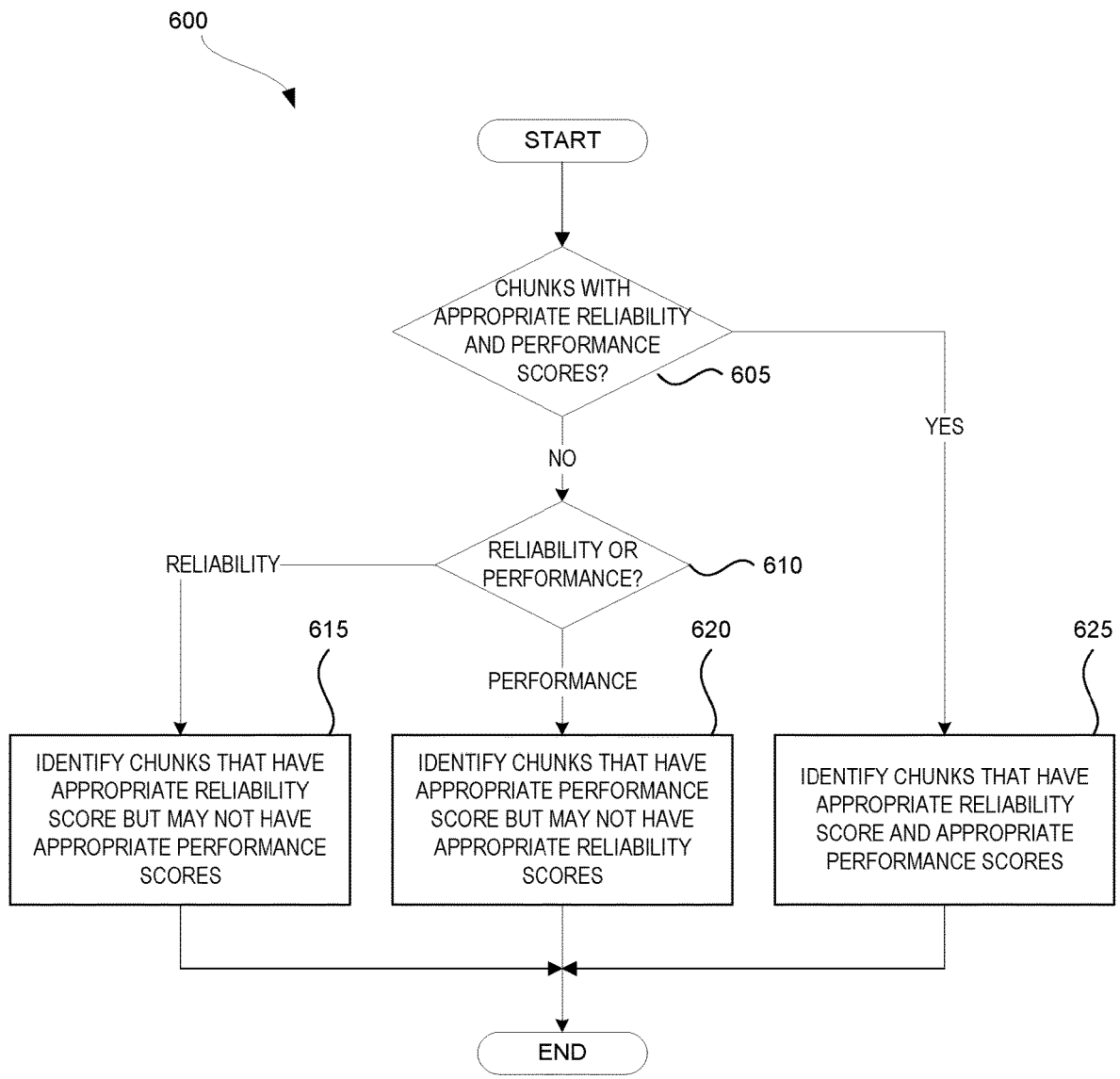
FIG. 6 is a flow diagram illustrating an example process for storing a multimedia asset in a storage array, according to an embodiment.

FIG. 6 is a flow diagram illustrating an example process 600 for storing a multimedia asset in a storage array, according to an embodiment. The process 600 may be performed by a multimedia processing module, a processing device (e.g., a processor, a central processing unit (CPU)), and/or a computing device (e.g., a server computing device). The multimedia processing module, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

At block 605, the process 600 may determine whether there are chunks in the storage array with appropriate reliability scores and performance scores for a portion of the multimedia asset. For example, the process 600 may analyze the access frequency levels and importance levels for the portion of the multimedia asset and may determine whether there are any chunks with appropriate performance scores and reliability scores for the access frequency levels and importance levels. If there are chunks with appropriate reliability scores and performance scores for the portion of the multimedia asset, the process 600 may identify those chunks are block 625. The portion of the multimedia asset may be stored on the identified chunks (with appropriate reliability scores and performance scores), as discussed above.

If there are no chunks with appropriate reliability scores and/or appropriate performance scores for the portion of the multimedia asset, the process 600 may determine whether reliability or performance is preferred. For example, the process 600 may determine whether a user prefers to have more protection (against loss) for the multimedia asset or prefers to have faster access to the multimedia asset. The process 600 may determine whether reliability or performance is preferred based on user input (received from a user), a configuration file, a setting, a parameter, etc. The process 600 may also determine whether reliability or performance is preferred based on VCA of the multimedia asset. For example, the process 600 may use VCA to determine that the multimedia asset is a video of a child's graduation and may determine that the multimedia asset may be important to the user such that reliability should be preferred.

If reliability is preferred, the process 600 may identify chunks that have appropriate reliability scores but may not have appropriate performance scores at block 615. In one embodiment, the process 600 may identify the chunks with appropriate reliability scores that have performance scores closest to the appropriate performance scores. For example, if a performance score of 2 would be appropriate but the storage array does not have chunks with the performance score of 2, the process 600 may identify chunks that have the next highest performance score (e.g., a performance score of 3).

If performance is preferred, the process 600 may identify chunks that have appropriate performance scores but may not have appropriate reliability scores at block 620. In one embodiment, the process 600 may identify the chunks with appropriate performance scores that have reliability scores closest to the appropriate reliability scores. For example, if a reliability score of 1 would be appropriate but the storage array does not have chunks with the reliability score of 1, the process 600 may identify chunks that have the next highest reliability score (e.g., a reliability score of 2).

Figure 7:
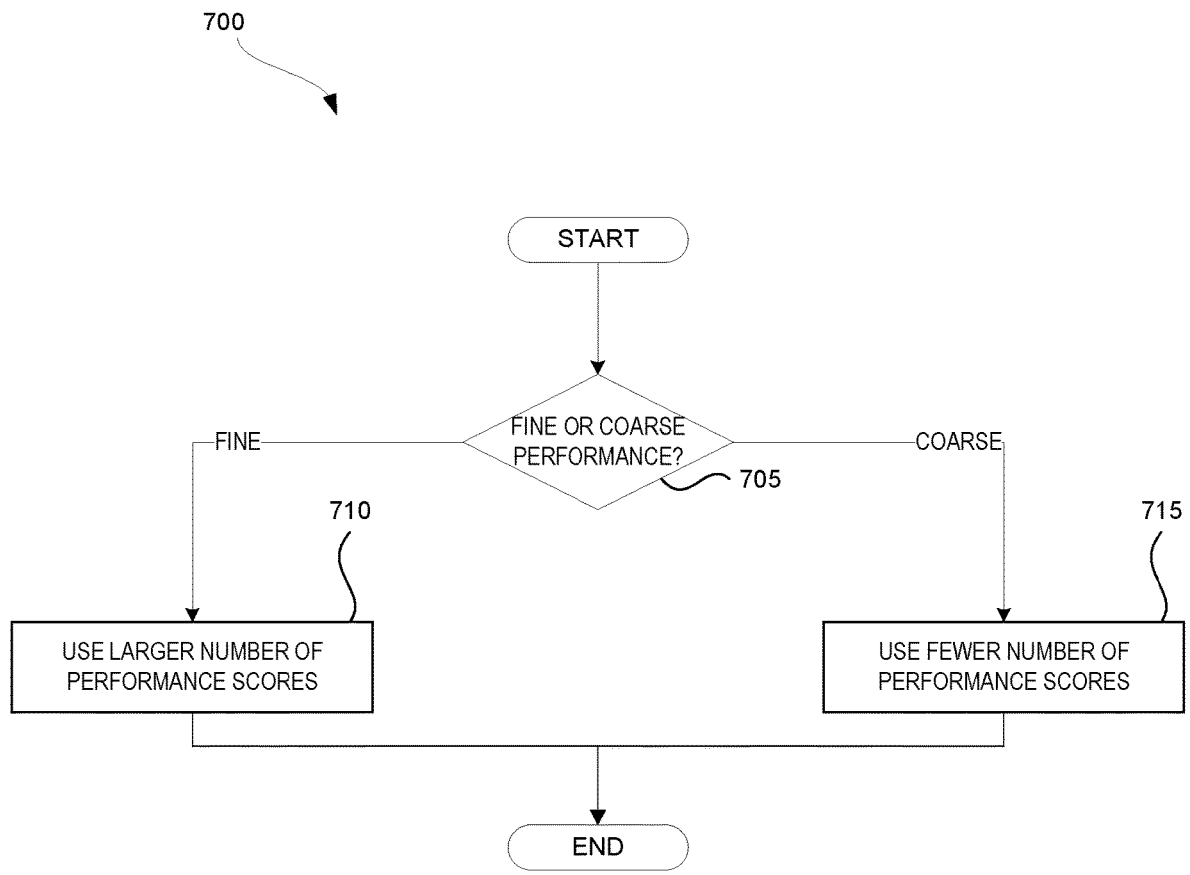
FIG. 7 is a flow diagram illustrating an example process for storing a multimedia asset in a storage array, according to an embodiment.

FIG. 7 is a flow diagram illustrating an example process 700 for storing a multimedia asset in a storage array, according to an embodiment. The process 700 may be performed by a multimedia processing module, a processing device (e.g., a processor, a central processing unit (CPU)), and/or a computing device (e.g., a server computing device). The multimedia processing module, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

At block 705, the process 700 may determine whether fine performance scores or coarse performance scores should be used when determining performance scores for chunks in the storage array. For example, the process 700 may receive user input, access a configuration file, access a setting/parameter, etc., to determine whether fine performance scores of coarse performance scores should be used. If fine performance scores should be used, the process 700 may use a larger range (or a larger number) of performance scores at block 710, as discussed above. If coarse performance scores should be used, the process 700 may use smaller range (e.g., a smaller number) of performance scores at block 715, as discussed above.

Figure 8:
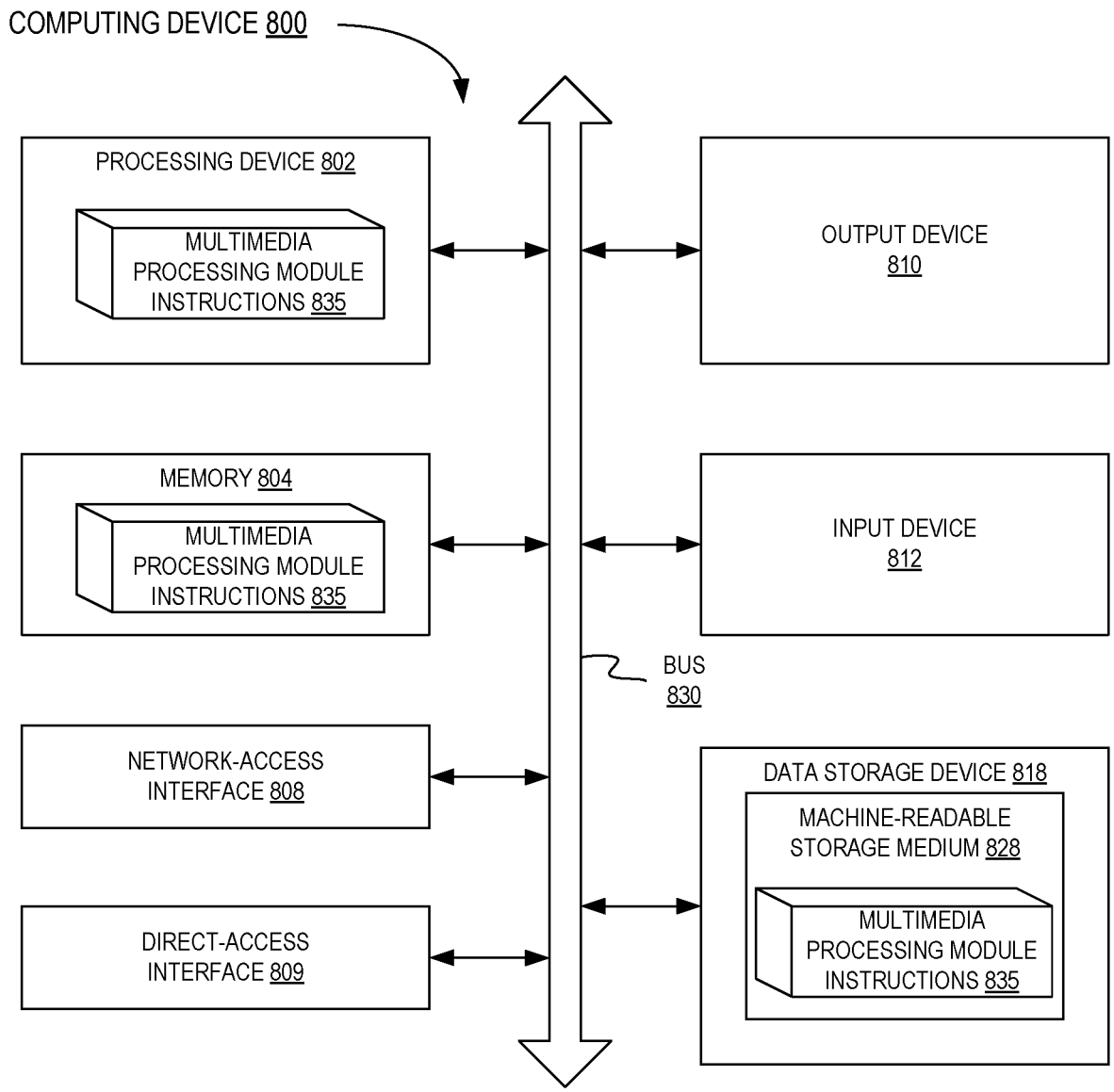

FIG. 8 is a diagram of a computing device 800, according to an embodiment. The computing device 800 may execute instructions that may cause the computing device 800 to perform any one or more of the methodologies (e.g., operations, methods, functions, etc.) discussed herein, may be executed. The computing device 800 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 800 includes a processing device (e.g., a processor, a controller, a central processing unit (CPU), etc.) 802, a main memory 804 (e.g., read-only memory (ROM), flash memory, dynamic random access memory (DRAM) such as synchronous DRAM (SDRAM)), a network-access interface 808, a direct-access interface 809, an output device, 810, an input device 812, and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute multimedia processing module instructions 835 (e.g., instructions for the multimedia processing module 211 illustrated in FIG. 2) for performing the operations and steps discussed herein.

The computing device 800 may include a network-access interface 808 (e.g., a network interface card, a Wi-Fi interface, etc.) which may communicate with a network (e.g., network 170 illustrated in FIG. 1). The computing device may also include a direct-access interface 809 (e.g., a USB interface, an eSATA interface, a Thunderbolt interface, etc.). The computing device 800 also may include an output device 810 (e.g., a liquid crystal display (LCD) or a cathode ray tube (CRT)), and an input device 812 (e.g., a mouse, a keyboard, etc.). In one embodiment, the output device 810 and the input device 812 may be combined into a single component or device (e.g., an LCD touch screen).

The data storage device 818 may include a computer-readable storage medium 828 on which is stored one or more sets of instructions (e.g., multimedia processing module instructions 835) embodying any one or more of the methodologies or functions described herein. The multimedia processing module instructions 835 may also reside, completely or at least partially, within the main memory 804 and/or within the processing device 802 during execution thereof by the computing device 800. The main memory 804 and the processing device 802 may also constitute computer-readable media. The instructions may further be transmitted or received over via the network-access interface 808 and/or direct-access interface 809.

While the computer-readable storage medium 828 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium (e.g., a non-transitory computer-readable medium) or other computer storage device or collection of storage devices. Some or all of the methods may alternatively be embodied in specialized computer hardware.

What is claimed is:

1. An apparatus for storing individual layers of a multimedia asset on selected chunks of one or more storage drives, the apparatus comprising:
    a storage array comprising one or more storage drives; and
    a processor configured to:
        determine a set of importance levels for the multimedia asset, wherein the multimedia asset comprises a set of layers including a base layer and one or more enhancement layers, wherein the set of layers have multiple importance levels;
        determine a set of access frequency levels for the set of layers of the multimedia asset;
        determine a first range for performance scores and a second range for reliability scores, the first range equal to a total number of layers of the multimedia asset;
        determine a respective performance score within the first range and a respective reliability score within the second range for a plurality of chunks in the storage array, wherein at least one storage drive of the storage array comprises a storage medium divided into chunks with different performance scores or reliability scores;
        for each layer of the set of layers of the multimedia asset, select a chunk from the plurality of chunks based on the importance level and access frequency level of the layer and the respective performance score and the respective reliability score of the chunk; and
        store each of the set of layers of the multimedia asset on the chunk selected for that layer such that a first layer having a higher importance level or access frequency level than a second layer is stored on a first chunk having a higher performance score or reliability score than a second chunk storing the second layer.

2. The apparatus of claim 1, wherein the respective performance score for each chunk of the plurality of chunks is based on a disk layout for a respective storage drive where the chunk is located.

3. The apparatus of claim 1, wherein the respective performance score for each chunk of the plurality of chunks is based on a type of storage media used by a respective storage drive where the chunk is located.

4. The apparatus of claim 1, wherein the respective reliability score for each chunk of the plurality of chunks is based on a redundant array of independent disks (RAID) level for the chunk.

5. The apparatus of claim 1, wherein the respective reliability score for each chunk is based on an erasure code for the chunk.

6. The apparatus of claim 1, wherein the one or more of storage drives comprise heterogeneous storage drives.

7. The apparatus of claim 1, wherein the one or more of storage drives comprise homogenous storage drives.

8. The apparatus of claim 1, wherein the multimedia asset comprises a scalable video coding (SVC) video and wherein the set of layers comprise layers of the SVC video.

9. The apparatus of claim 1, wherein the multimedia asset comprises a video and wherein the set of layers comprise different periods of time in the video.

10. The apparatus of claim 1, wherein the storage array comprises a declustered redundant array of independent disks (RAID) array.

11. The apparatus of claim 1, further comprising memory configured to store a table associating chunks to layers of multimedia assets.

12. The apparatus of claim 11, wherein each entry in the table is associated with a value indicating an access frequency for a corresponding layer.

13. The apparatus of claim 11, wherein each entry in the table is associated with a value indicating a performance level for a corresponding layer.

14. The apparatus of claim 11, wherein the table is ordered in accordance with physical locations of the chunks on a storage medium.

15. The apparatus of claim 1, wherein selecting the chunk from the plurality of chunks comprises:
    in response to determining that chunks with an appropriate reliability and performance score are unavailable, prioritizing one of the reliability score or the performance score and lowering the required score for the unprioritized score until a suitable chunk is found.

16. A method for storing individual layers of a multimedia asset on selected chunks of one or more storage drives, the method comprising:
    determining a set of importance levels for the multimedia asset, wherein the multimedia asset comprises a set of layers including a base layer and one or more enhancement layers, wherein the set of layers have multiple importance levels;
    determining a set of access frequency levels for the set of layers of the multimedia asset;
    determining a first range for performance scores and a second range for reliability scores, the first range equal to a total number of layers of the multimedia asset;
    determining a respective performance score within the first range and a respective reliability score within the second range for a plurality of chunks in a storage array, the storage array comprising one or more storage drives, wherein at least one storage drive of the storage array comprises a storage medium divided into chunks with different performance scores or reliability scores;

for each layer of the set of layers of the multimedia asset, selecting a chunk from the plurality of chunks based on the importance level and access frequency level of the layer and the respective performance score and the respective reliability score of the chunk; and storing each of the set of layers of the multimedia asset on the chunk selected for that layer such that a first layer having a higher importance level or access frequency level than a second layer is stored on a first chunk having a higher performance score or reliability score than a second chunk storing the second layer.

17. The method of claim 16, wherein selecting the chunk from the plurality of chunks comprises:

in response to determining that chunks with an appropriate reliability and performance score are unavailable, prioritizing one of the reliability score or the performance score and lowering the required score for the unprioritized score until a suitable chunk is found.

18. The method of claim 16, wherein the respective performance score for each chunk of the plurality of chunks is based on a disk layout for a respective storage drive where the chunk is located.

19. A storage system for storing individual layers of a multimedia asset on selected chunks of one or more storage means, the storage system comprising:

a storage array comprising one or more storage means; and a processing means configured to:

determine a set of importance levels for the multimedia asset, wherein the multimedia asset comprises a set of layers including a base layer and one or more enhancement layers, wherein the set of layers have multiple importance levels;

determine a set of access frequency levels for the set of layers of the multimedia asset;

determine a first range for performance scores and a second range for reliability scores, the first range equal to a total number of layers of the multimedia asset;

determine a respective performance score within the first range and a respective reliability score within the second range for a plurality of chunks in the storage array, wherein at least one storage means of the storage array comprises a storage medium divided into chunks with different performance scores or reliability scores;

for each layer of the set of layers of the multimedia asset, select a chunk from the plurality of chunks based on the importance level and access frequency level of the layer and the respective performance score and the respective reliability score of the chunk; and store each of the set of layers of the multimedia asset on the chunk selected for that layer such that a first layer having a higher importance level or access frequency level than a second layer is stored on a first chunk having a higher performance score or reliability score than a second chunk storing the second layer.

\* \* \* \* \*